US008194399B2

(12) United States Patent
Ashcraft et al.

(10) Patent No.: US 8,194,399 B2
(45) Date of Patent: Jun. 5, 2012

(54) ALTERING THE FLEXIBILITY OF A DISPLAY DEVICE

(75) Inventors: Britt C. Ashcraft, Tomball, TX (US); Peter M. On, Houston, TX (US); Dustin L. Hoffman, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 213 days.

(21) Appl. No.: 12/837,719

(22) Filed: Jul. 16, 2010

(65) Prior Publication Data

US 2012/0014054 A1    Jan. 19, 2012

(51) Int. Cl.
  *G06F 1/16*    (2006.01)
(52) U.S. Cl. ............... 361/679.05; 257/59; 345/589; 362/104
(58) Field of Classification Search ............ 257/40, 257/43, 59; 345/207, 214, 173, 212, 589; 345/501; 361/679.01, 679.05, 679.03, 679.26, 361/679.33, 679.34; 349/43, 129, 61, 143, 349/106; 362/97.1, 249.4, 103, 104
  See application file for complete search history.

(56) References Cited

U.S. PATENT DOCUMENTS

| 7,180,665 | B2 | 2/2007 | Daniel et al. | |
|---|---|---|---|---|
| 2003/0048256 | A1 | 3/2003 | Salmon | |
| 2003/0071259 | A1* | 4/2003 | Yoshida | 257/40 |
| 2005/0285963 | A1 | 12/2005 | Misawa et al. | |
| 2008/0198541 | A1 | 8/2008 | Lin et al. | |
| 2008/0303782 | A1 | 12/2008 | Grant et al. | |
| 2011/0102390 | A1* | 5/2011 | Moriwaki | 345/207 |
| 2011/0273826 | A1* | 11/2011 | Misawa | 361/679.01 |

FOREIGN PATENT DOCUMENTS

| DE | 102008032002 A1 | 3/2010 |
|---|---|---|
| JP | 11109880 A | 4/1999 |

OTHER PUBLICATIONS

"Future Designer laptop—ROLLTOP //Diploma Thesis//"; http://www.youtube.com/watch?v=7H0K1k54t6A; Publication Date: Sep. 17, 2009.
"Rollable Displays"; http://www.youtube.com/watch?v=8VoNkd4OGqU&NR=1; Publication Date: Apr. 23, 2008.
"Polymer Vision's Readius Rollable Display Gets Face Time"; http://www.youtube.com/watch?v=dpgwgfnUs4E&feature=PlayList&p=F949BF01516E0F1D&playnext=1&playnext_from=PL&index=55; Publication Date: Feb. 14, 2008.
"Rollable Display"; http://www.youtube.com/watch?v=UUYBgd2EriU; Publication Date: May 28, 2007.

\* cited by examiner

*Primary Examiner* — Hung Duong
(74) *Attorney, Agent, or Firm* — Sarah E. Burrows

(57) ABSTRACT

Disclosed embodiments relate to altering the flexibility of a display device. A method for altering the flexibility of a display device may include sending a signal, by a circuit, to alter the temperature of a first section of a display device comprising the first section and a second section. The flexibility of the first section may be changed in response to the temperature alteration of the first section. The method may further include sending a signal, by the circuit, to alter the temperature of the second section of the display device. In one embodiment, the flexibility of the second section is changed in response to the temperature alteration of the second section.

15 Claims, 5 Drawing Sheets

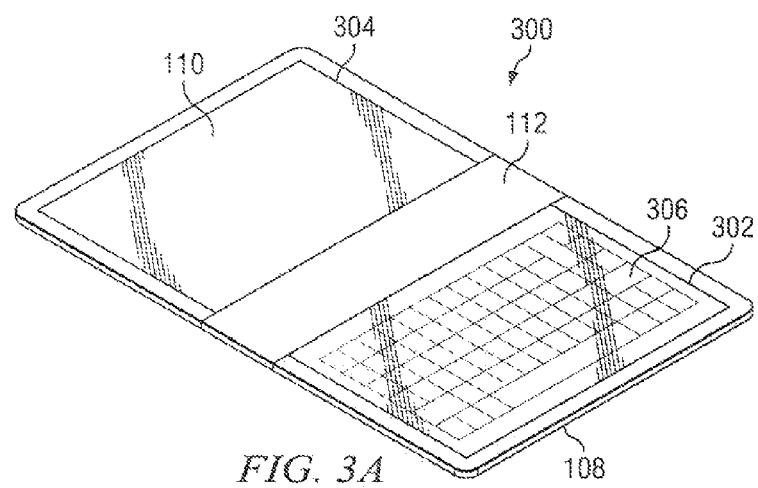
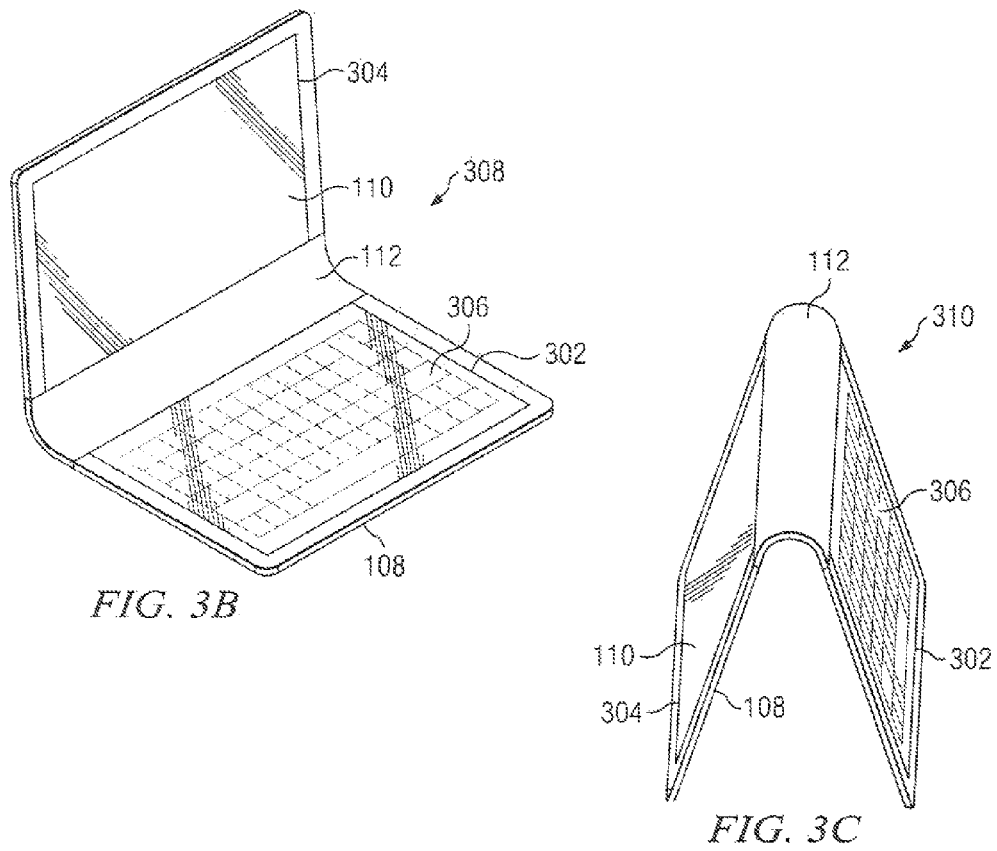

ALTERING THE FLEXIBILITY OF A DISPLAY DEVICE

BACKGROUND

Display devices are advancing in functionality. For example, touch technology may allow a display device to be used for both displaying information to a user and receiving user input. As user input options to display devices increase, it is desirable to have advances in physical configurations of display devices as well.

BRIEF DESCRIPTION OF THE DRAWINGS

In the accompanying drawings which provide examples of the invention, like numerals refer to like components or blocks. The drawings provide example embodiments. The following detailed description references the drawings, wherein:

FIG. 3A is a diagram illustrating one embodiment of a configuration of a display device.

FIG. 3B is a diagram illustrating another embodiment of a configuration of a display device.

FIG. 3C is a diagram illustrating another embodiment of a configuration of a display device.

DETAILED DESCRIPTION

As display devices become more prominent aspects of electronic devices, it is desirable to create a display device that provides a user with more options to adjust the physical configuration of a display device. Display devices, such as touch screens, are often made from a rigid material which may prevent the display device from being bent or adjusted. In some cases, a display device is created from a flexible material such that the display device may be become more flexible or more rigid. For example, a display device may be placed in a more rigid state when in use and may be placed in a more flexible state to allow for greater portability. Such a display device, however, may involve the entire display being in a flexible or rigid state. As a result, the types of adjustable configurations for the display device may be limited.

In one embodiment, a display device is divided into multiple sections where each section may have a different level of flexibility, thereby, resulting in a display device with multiple adjustable positions. For example, practical applications include a display device configured as a laptop that may be folded in half where a middle point is flexible for folding, a top section is a rigid display, and a bottom section is a rigid touch keyboard. Another application includes a display device that may be adjusted to various sizes, for example, by having a section of it that is more flexible that may be folded away.

In one embodiment, a display device may be created from a flexible material, such as memory metal, that changes flexibility in response to changes in temperature. The temperature may be altered to different levels in different sections of a display device such that sections of the display device have different levels of flexibility from one another. For example, a display device may initially be in a rigid state, and the temperature of a section of the display device may be altered so that the section becomes more flexible than the rest of the display device. Controlling the flexibility of a display device using temperature alterations may in some cases allow the display device to be a single piece of material such that visible divisions are not created in the display device. As a result, images on the display device may appear continuous.

Figure 1:
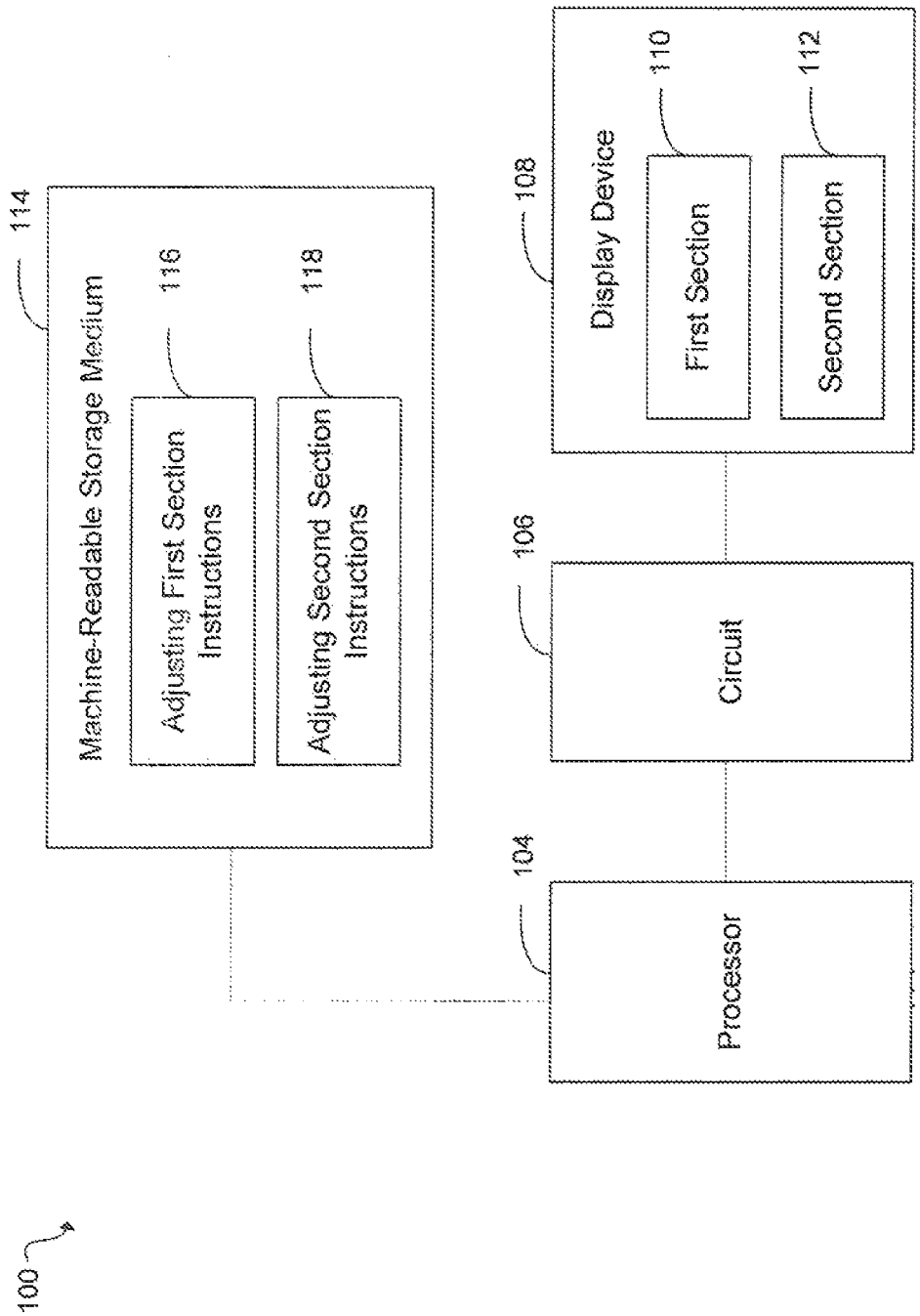
FIG. 1 is a block diagram illustrating one embodiment of a computing system.

FIG. 1 is a block diagram illustrating one embodiment of a computing system 100. The computing system 100 may be any suitable computing system. For example, the computing system 100 may be a notebook computer, touch screen computer, or a mobile phone. The computing system 100 may include, for example, a processor 104, a circuit 106, a display device 108, and a machine-readable storage medium 114.

The processor 104 may be any suitable processor, such as a central processing unit (CPU), a semiconductor-based microprocessor, or any other device suitable for retrieval and execution of instructions stored in the machine-readable storage medium 114. In one embodiment, the computing system 100 includes logic instead of or in addition to the processor 104. In one embodiment, the processor 104 is made from flexible components such that it may bent or adjusted along with the display device 108.

The circuit 106 may be any suitable circuit. The circuit 106 may alter the temperature of the display device 108 or a section of the display device 108, such as by sending an electric charge to the display device 108. The circuit 106 may, for example, receive a signal from the processor 104 to instruct it to adjust the temperature of the display device 108, such as an instruction to send an electric charge or refrain from sending an electric charge. In one embodiment, the computing system 100 includes a component to measure the temperature of the display device 108, and the processor 104 may use the information about the temperature to determine whether to instruct the circuit 106 to alter the temperature of the display device 108.

The display device 108 may be any suitable display device, such as a monitor, mobile phone, or touch screen computer. The display device 108 may include a display area, such as a Liquid Crystal Display (LCD). In some cases, other components of the computing system 100, such as the processor 104, the circuit 106, and the machine-readable storage medium 114, are included within the display device 108, such as a slate touch screen computer or a mobile phone. In some implementations, the display device 108 may be separate from some of the other components of the computing system 100, such as in some notebook or desktop computers. The processor 104, machine-readable storage medium 114, and the circuit 106 may be made of flexible components such that they are able to bend along with the display device 108.

The display device 108 may be made from any suitable material. In one embodiment, the display device 108 is created from a shape memory metal that alters its flexibility in response to an alteration in temperature. Any suitable memory alloy may be used, such as copper-zinc-aluminum-nickel, copper-aluminum-nickel, or nickel-titanium.

The display device 108 may include multiple sections, such as a first section 110 and a second section 112. In some cases, the first section 110 and the second section 112 may be connected. The first section 110 and the second section 112 may be portions of a continuous section of the display device 108 such that the first section 110 and the second section 112 are not physically separated. For example, the sections may be created by sections of the display device 108 controlled separately by the circuit 106. In one embodiment, the first section 110 and the second section 110 are separated, such as by metal or another material. The first section 110 and the second section 112 may each be any suitable section of the display device 108. For example, the first section 110 and the second section 112 may cover the entire display device 108 or less than the entire display device 108.

In one embodiment, the flexibility of the first section 110 and the second section 112 is altered when the circuit 106 changes the temperature of the display device 108. For example, if the temperature of the first section 110 reaches a transition point, such as a temperature above a transition point or below a transition point, the flexibility of the first section 110 may be altered. The temperature of the first section 110 and the second section 112 may be altered separately such that one section is more flexible than the other. For example, the circuit 106 may increase the temperature of the second section 112 so that it becomes more rigid, and the first section 110 may remain flexible. In some cases, the circuit 110 may send a signal to maintain the temperature of the first section 110 or the second section 112. The display device 108 may include additional sections similar to the first section 110 and the second section 112. For example, the display device 108 may include five sections, each with a different level of flexibility, or five section such that some sections of the display device 108 have one level of flexibility and other sections of the display device 108 have other levels of flexibility.

In one embodiment, the computing system 100 includes a component, such as a mouse or keyboard, for user input. In one embodiment, the display device 108 receives touch input from a user. For example, the display device 108 may contain a sensor for determining whether a user is touching the display device 108 and the position of the touch. In one embodiment, user input, such as through a button, touch screen input, other input device, instructs the circuit 106 to alter the temperature of the display device 108. For example, a user may select a configuration for the display device 108, and the input device may communicate the selected configuration to the circuit 106.

The machine-readable storage medium 114 may be any electronic, magnetic, optical, or other physical storage device that stores executable instructions or other data (e.g., a hard disk drive, random access memory, flash memory, etc.). The machine-readable storage medium 114 may include, for example, adjusting first section instructions 116 for adjusting the first section 110 of the display device 108 and adjusting second section instructions 118 for adjusting the second section 112 of the display device 108. In one embodiment, the processor 104 executes the adjusting first section instructions 116 and the adjusting second section instructions 118.

Figure 2:
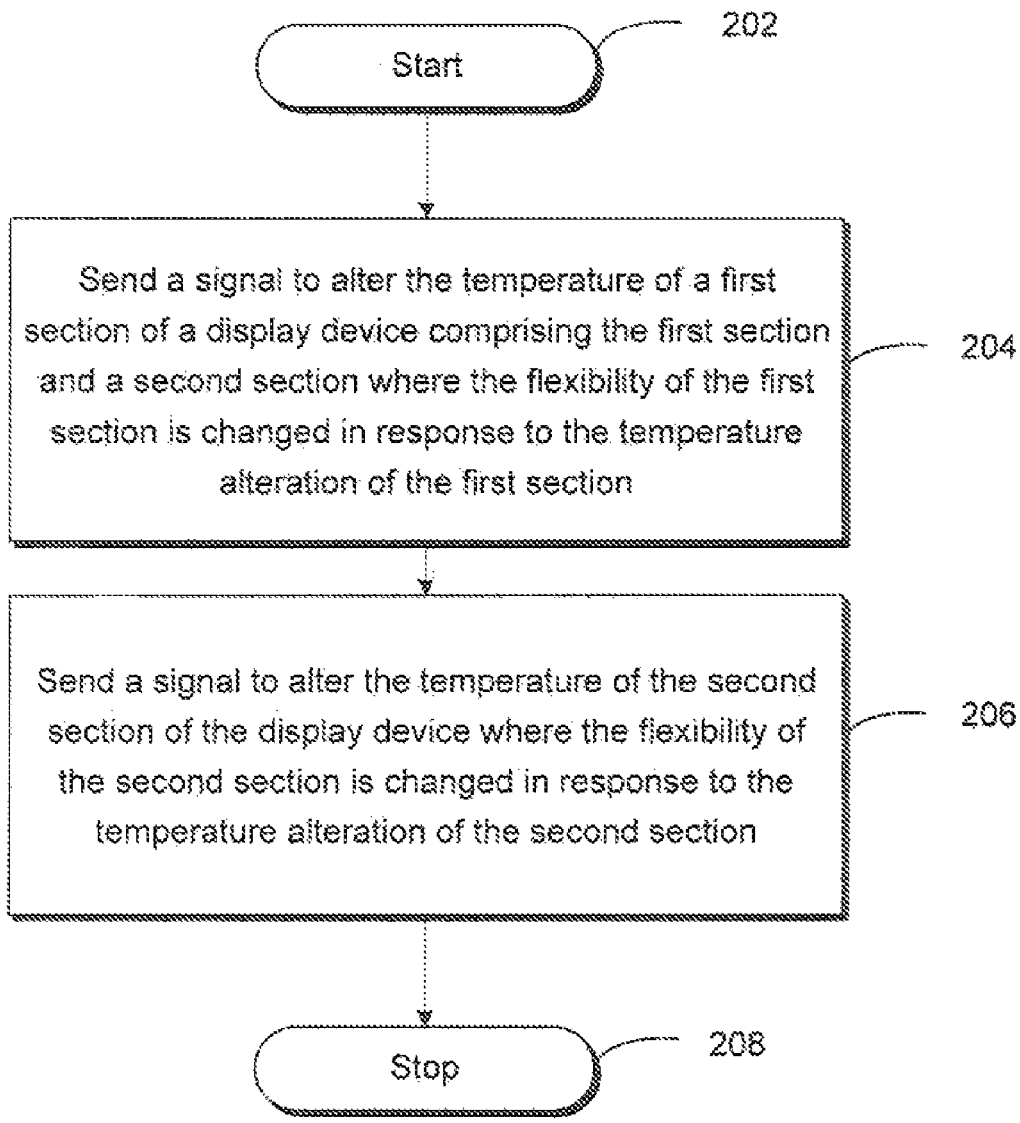
FIG. 2 is a flow chart illustrating one embodiment of a method for altering the flexibility of a display device.

FIG. 2 is a flow chart illustrating one embodiment of a method 200 for adjusting the flexibility of the display device 108. For example, adjusting the temperature of the display device 108 may alter the flexibility of the display device 108. In one embodiment, the circuit 106 may adjust the temperature of the display device 108 such that the first section 110 has a different level of flexibility than the second section 112. For example, one section may be flexible enough to bend and another section may be more rigid.

Beginning at block 202 and continuing to block 204, the circuit 106 sends a signal to alter the temperature of the first section 110 of the display device 108 comprising the first section 110 and the second section 112 where the flexibility of the first section 110 is changed in response to the temperature alteration of the first section 110. For example, the processor 104 may execute the adjusting first section instructions 116 to instruct the circuit 106 instructing to alter the temperature of the first section 110 of the display device 108. In one embodiment, the circuit 106 alters the temperature of the first section 110 in response to user input. In some implementations, the user input may indicate a section of the display device 108 to be altered and the degree of desired flexibility for the selected section. The circuit 106 may alter the temperature of the first section 110 in any suitable manner, such as by sending an electric charge to the first section 110 or by no longer sending an electric charge to the first section 110.

The circuit 106 may increase or decrease the temperature of the first section 110. In one embodiment, the processor 104 determines an amount of temperature alteration that should occur to place the first section 110 of the display device 108 at the desired level of flexibility. For example, the processor 104 may measure the temperature or the flexibility of the first section 110 and determine the amount of temperature increase or decrease that would likely result in the desired level of flexibility.

The flexibility of the first section 110 of the display device 108 may be changed in response to the temperature alteration of the first section 110. For example, the first section 110 may be created from memory metal that changes flexibility states based on its temperature. In one embodiment, the flexibility of the second section 112, of the display device 108 is unchanged in response to the temperature alteration of the first section 110.

The flexibility of the first section 110 may be altered in any suitable manner. The first section 110 may, for example, become more flexible or more rigid. The first section 110 may become more rigid such that it may not be adjusted or more flexible such that a user can bend or adjust it. In some implementations, the first section 110 will automatically bend or the processor 106 will cause the first section to bend. In some embodiments, the first section 110 becomes more flexible allowing a user to shape it. The circuit 106 may maintain the temperature of the first section 110 such that it retains the level of flexibility. The circuit 106 may allow or cause the temperature to decrease such that the flexibility of the first section 110 to change over time. A user may adjust the first section 110 when it is in a more flexible state and then instruct the circuit 106 to alter the temperature of the first section 110 so that it becomes more rigid in the adjusted position. Factors in addition to temperature may also affect the flexibility of the first section 110.

Continuing to block 206, the circuit 106 sends a signal to alter the temperature of the second section 112 of the display device 108 where the flexibility of the second section 112 is changed in response to the temperature alteration of the second section 112. In some implementations, the processor 104 may execute the adjusting second section instructions 118 to instruct the circuit 106 to alter the temperature of the second section 112. The circuit 106 may alter the flexibility of the second section 112 in any suitable manner, such as by sending an electric charge to the second section 112. The second section 112 may be created from a material, such as a memory alloy, that alters its flexibility in response to a temperature change. The first section 110 and the second section 112 may be made from the same or different materials. The flexibility of the second section 112 may be changed in any suitable manner, such as becoming more rigid or more flexible. The flexibility of the first section 110 of the display device 108 may be unchanged in response to the temperature alteration of the second section 112.

In one embodiment, the flexibility of the second section 112 is independent of the flexibility of the first section 110. For example, the second section 112 may retain its level of flexibility when the circuit 106 alters the temperature of the first section 110 to make it more flexible or rigid. This allows the display device 108 to have sections with different levels of flexibility, such as both flexible and rigid sections at the same time. In one embodiment, the processor 104 displays image data differently on the display device 108 based on the position and flexibility of the first section 110 and the second section 112. In some cases, one or more sections of the display device 108 may be in a flexible state, and a user may determine how to shape the flexible sections. In some implementations, the circuit 106 alters the temperature of the first section 110 and another circuit alters the temperature of the second section 112. The method 200 then continues to block 208 and ends.

FIG. 3A is a block diagram illustrating one embodiment of a configuration 300 of the display device 108. FIG. 3A shows the display device 108, including the first section 110, the second section 112, and a third section 302 similar to the first section 110 and the second section 112. The configuration 300 shows the display device 108 in a more rigid position, such as a position that allows the display device 108 to function as a touch screen computer. For example, the processor 104 may display an image 304 on the first section 110, and the processor 104 may display an image 306 of a touch keyboard for user input on the third section 302.

The circuit 106 may alter the temperature of the first section 110, the second section 112, and the third section 302 to change the flexibility of the display device 108. For example, each section of the display device 108 may initially be in a flexible state, and the circuit 106 may increase the temperature of the first section 110, the second section 112, and the third section 302 so that each of these sections becomes more rigid as shown in the configuration 300. The other components of the computing system 100, including the processor 104, the machine-readable storage medium 114, and the circuit 106 may be included within the housing of the display device 108. The components may be created from flexible material such that they may bend with the display device 108. In some cases, the components may reside in a section of the display that is not affected by the circuit 106 and does not bend.

FIG. 3B is a block diagram illustrating one embodiment of a configuration 308 of the display device 108. FIG. 3B shows the display device 108 from the configuration 300 in FIG. 3A including the first section 110, the second section 112, and the third section 302. In some implementations, the circuit 106 may alter the display device 108 such that different sections have different levels of flexibility. The configuration 308 shows the display device 108 adjusted in a position similar to a notebook computer. For example, the circuit 106 may adjust the temperature of the display device 108 such that the first section 110 remains in a more rigid state, the second section 112 becomes more flexible, and the third section 112 remains in a more rigid state. In one embodiment, the circuit 106 maintains a higher temperature for the first section 110 and the third section 302 and causes or allows the temperature of the second section 112 to decrease. In one embodiment, the processor may be placed in the configuration 308 and display data in a book format with text shown on the first section 110 and the third section 302.

FIG. 3C is a block diagram illustrating one embodiment of a configuration 310 of the display device 108. FIG. 3C shows the display device 108 from the configuration 300 in FIG. 3A with the first section 110, the second section 112, and the third section 302. The configuration 310 shows the second section 112 bent such that the first section 110 and the second section 112 display images on each side of the display device. For example, the image 304 may be displayed on the first section 110 and the image 306 may be displayed on the third section 302. The circuit 106 may adjust the temperature of the display device 108 such that the first section 110 remains in a more rigid state, the second section 112 becomes more flexible, and the third section 112 remains in a more rigid state. In one embodiment, the display device 108 is bent such that it may stand on a surface. Other embodiments are also contemplated where the display device 108 is placed in other positions with a flexible middle section.

Figure 4A:
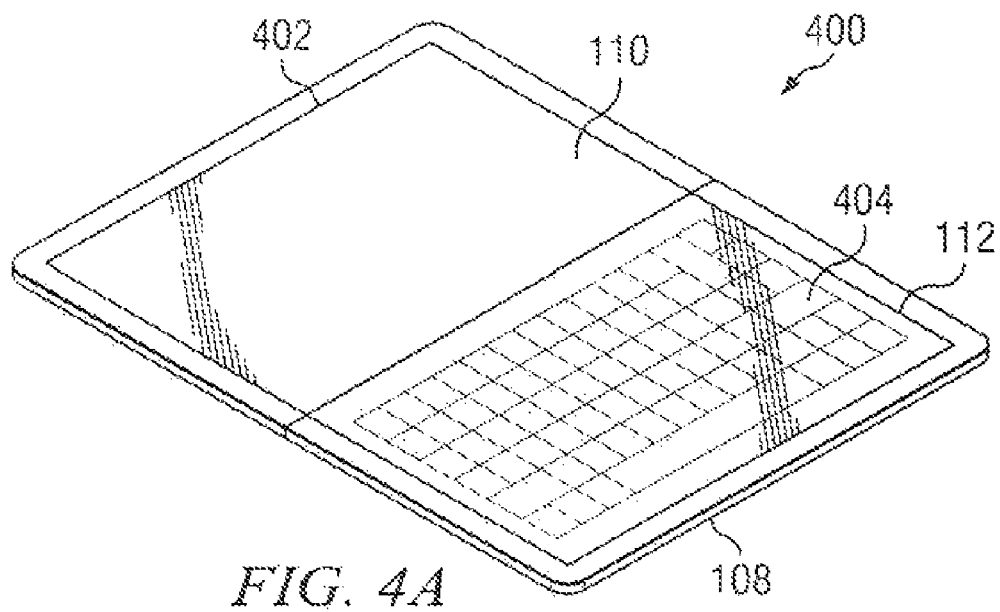
FIG. 4A is a diagram illustrating another embodiment of a configuration of a display device.

FIG. 4A is a block diagram illustrating one embodiment of a configuration 400 of the display device 108. FIG. 4A illustrates the display device 108 with the first section 110 and the second section 112. The display device 108 may be in a more rigid state, for example, to function as a touch screen. The circuit 106 may alter the temperature of the first section 110 and the second section 112, such as by increasing the temperature, such that the sections are more rigid. An image 402 may be displayed on the first section 110, and an image 404 may display a keyboard on the second section 112.

Figure 4B:
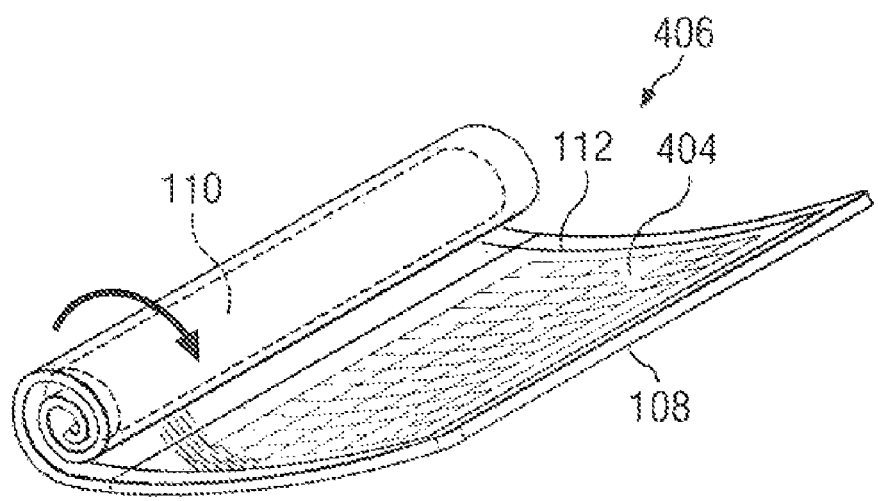
FIG. 4B is a diagram illustrating another embodiment of a configuration of a display device.

FIG. 4B is a block diagram illustrating one embodiment of a configuration 406 of the display device 108. The configuration 406 may be, for example, a continuation of the configuration 400 shown in FIG. 4A. The display device 108 includes the first section 110 and the second section 112. In some embodiments, multiple sections of the display device 108 may have a similar level of flexibility. For example, the configuration 406 shows the first section 110 and the second section 112 in a more flexible position, such as a position where the display device may be folded or scrolled. The display device 108 may be placed in a more flexible position, for example, for portability purposes. The circuit 106 may alter the temperature of the first section 110 and the second section 112 so that they are in a more flexible state, such as by decreasing the temperature of the first section 110 and the second section 112. In one embodiment, the display device 108 begins to scroll without user intervention. In another embodiment, a user may scroll or wrap the display device 108 when it is in a more flexible state. In some implementations, the components, such as the processor 104 are included in the display device 108, and the components are created from a flexible material so that they may bend with the display device 108. The circuit 106 may alter the temperature of the first section 110 and the second section 112 such that they become more rigid in a bent position, such that the display device 108 holds the scroll position.

Figure 5A:
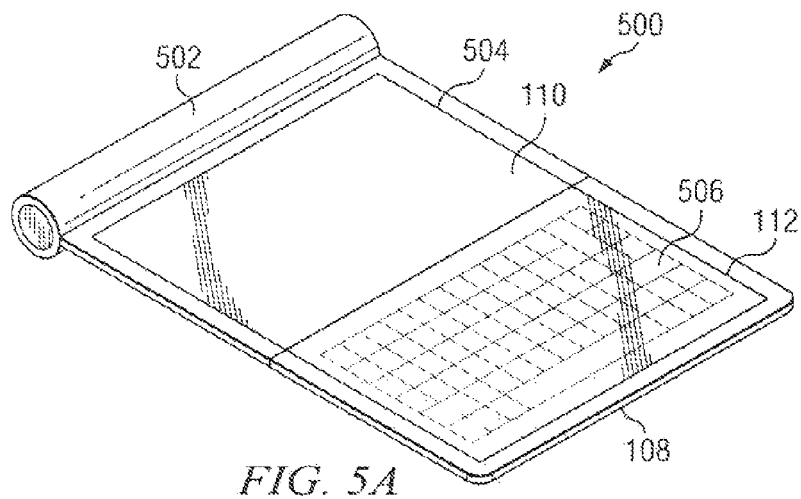
FIG. 5A is a diagram illustrating another embodiment of a configuration of a display device.

FIG. 5A is a block diagram illustrating one embodiment of a configuration 500 of the display device 108. FIG. 5A includes the display device 108, including the first section 110 and the second section 112, and components 502. The components 502 may include, for example, the processor 104, the machine-readable storage medium 114, or the circuit 106. In some implementations, the components 502 include a power source or other electrical components. The components 502 may be positioned separately from the display device 108 in any suitable configuration, such as in a cylindrical shape as shown in FIG. 5A. Keeping the components 502 separate from the display device 108 may allow the components to be made of more rigid material such that they do not bend with the display device 108. The configuration 500 shows the first section 110 and the second section 112 in a more rigid position, such as in a position where the display device 108 may be in use. For example, an image 504 shows a display screen on the first section 110, and an image 506 shows a touch keyboard on the second section 112.

Figure 5B:
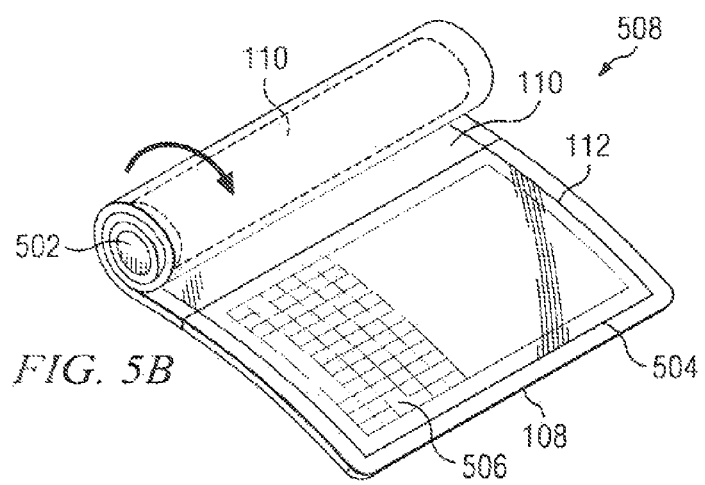
FIG. 5B is a diagram illustrating another embodiment of a configuration of a display device.

FIG. 5B is a block diagram illustrating one embodiment of a configuration 508 of the display device 108. FIG. 5B shows the components 502 and the display device 108 containing the first section 110 and the second section 112. A user may adjust the display device 108 from the configuration 500 in FIG. 5A to the configuration 508 where the display device 108 has a smaller display area. The display device 108 may be wrapped around the components 502, such as scrolled around them as shown in the configuration 508. The configuration 508 shows the first section 110 in a more flexible position such that it may be wrapped around the components 502. The configuration 508 shows the second section 112 in a more rigid position. For example, the circuit may alter the temperature of the first section 110 and the second section 112 such that they have different levels of flexibility. The second section 112 may serve as a smaller display screen. For example, the second section 112 displays the image 504 of a display screen and the image 506 of a touch keyboard. The configuration 508 may allow a user to hold the display device 108 by holding the scrolled section of the display device 108 and use the section of the display device 108 that is not scrolled. In some cases, a similar configuration with a smaller display screen may be created without the components 502 being in a separate compartment. For example, the components could be part of the flexible display device 108.

Figure 5C:
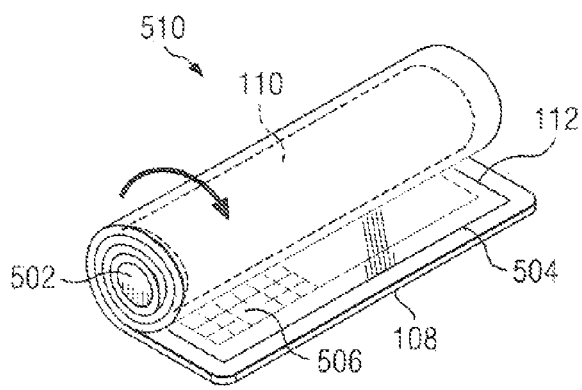
FIG. 5C is a diagram illustrating another embodiment of a configuration of a display device.

FIG. 5C is a block diagram illustrating one embodiment of a configuration 510 of the display device 108. A user may adjust the display device 108 from the configuration 500 of FIG. 5A or the configuration 508 from FIG. 5B to the configuration 506. A user may alter the display device 108 from the configuration 510 back to the configuration 508 or 500. The configuration 510 shows the first section 110 and the second section 112 in a more flexible state such that they may wrap around the electrical components 502, for example, to allow the display device 108 to be transported or stowed away.

The display device 108 may be placed in any suitable configuration. FIGS. 3A, 3B, 4A, 4B, 5A, 5B, and 5C serve as examples. Other configurations of the computing system 100 and the display device 108 are also contemplated.

Embodiments disclosed herein provide advantages. For example, a display device that may have sections of varying levels of flexibility allows the display device to have multiple adjustable positions. A user may be able to tailor the configuration of a display device based on the intended use of the display device.

The invention claimed is:

1. A computing system, comprising:
a display device comprising a first section and a second section;
a processor to display image data on the display device; and
a circuit to:
alter the temperature of the first section of the display device, wherein the flexibility of the first section is changed in response to the temperature alteration of the first section; and
alter the temperature of the second section of the display device, wherein the flexibility of the second section is changed in response to the temperature alteration of the second section.

2. The computing system of claim 1, wherein the display device is configured to fold around the processor.

3. The computing system of claim 1, wherein the display device comprises memory metal.

4. The computing system of claim 1, wherein the first section and the second section have different levels of flexibility.

5. The computing device of claim 1, further comprising a power source, wherein the display device is configured to wrap around the power source.

6. A method for altering the flexibility of a display device, comprising:
sending a signal, by a circuit, to alter the temperature of a first section of a display device comprising the first section and a second section,
wherein the flexibility of the first section is changed in response to the temperature alteration of the first section; and
sending a signal, by the circuit, to alter the temperature of the second section of the display device,
wherein the flexibility of the second section is changed in response to the temperature alteration of the second section.

7. The method of claim 6, wherein the display device comprises a memory alloy.

8. The method of claim 6, wherein the first section and the second section have different levels of flexibility.

9. The method of claim 6, wherein the first section of the display device stiffens in response to the temperature alteration.

10. The method of claim 9, wherein stiffening in response to the temperature alteration comprises stiffening in a bent position.

11. The method of claim 6, wherein the display device folds around electrical components.

12. A machine-readable storage medium encoded with instructions executable by a processor for altering the flexibility of a display device, comprising instructions to:
adjust the temperature of a first section of a display device; and
adjust the temperature of a second section of the display device,
wherein the flexibility of the first section of the display device is altered based on the temperature of the first section of the display device and
wherein the flexibility of the second section of the display device is altered based on the temperature of the second section of the display device.

13. The machine-readable storage medium of claim 12, wherein the first section of the display device becomes more rigid when its temperature increases.

14. The machine-readable storage medium of claim 12, wherein the second section of the display device becomes more rigid when its temperature increases.

15. The machine-readable storage medium of claim 12, wherein the flexible display device comprises memory metal.

* * * * *